United States Patent [19]

Tokusima et al.

[11] Patent Number: 4,562,373
[45] Date of Patent: Dec. 31, 1985

[54] PIEZOELECTRIC MOTOR

[75] Inventors: Akira Tokusima, Kyoto; Ritsuo Inaba, Neyagawa, both of Japan

[73] Assignee: Matsushita Electric Industrial Co., Ltd., Kadoma, Japan

[21] Appl. No.: 663,453

[22] Filed: Oct. 22, 1984

[30] Foreign Application Priority Data

Oct. 21, 1983 [JP] Japan ................................. 58-197841
Oct. 21, 1983 [JP] Japan ................................. 58-197842

[51] Int. Cl.⁴ ............................................ H01L 41/08
[52] U.S. Cl. .................................. 310/328; 310/323; 310/12
[58] Field of Search ............... 310/323, 328, 369, 366, 310/357, 358, 12

[56] References Cited

U.S. PATENT DOCUMENTS 4,484,099 11/1984 Kawai et al. ......................... 310/323
4,504,760 3/1985 Yamamoto et al. ............. 310/328 X
4,510,411 4/1985 Hakamata et al. .............. 310/323 X
4,513,219 4/1985 Katsuma et al. .................... 310/328

Primary Examiner—Mark O. Budd
Attorney, Agent, or Firm—Wenderoth, Lind & Ponack

[57] ABSTRACT

A piezoelectric motor wherein a stator comprising piezoelectric vibrators of rectangular or circular plate form pasted with a metal is used as a power source and a mechanical vibration in two directions, longitudinal and widthwise directions or radial and tangential directions, is converted into a rotary or linear motion through frictional force.

7 Claims, 11 Drawing Figures

U.S. Patent   Dec. 31, 1985   Sheet 1 of 3   4,562,373
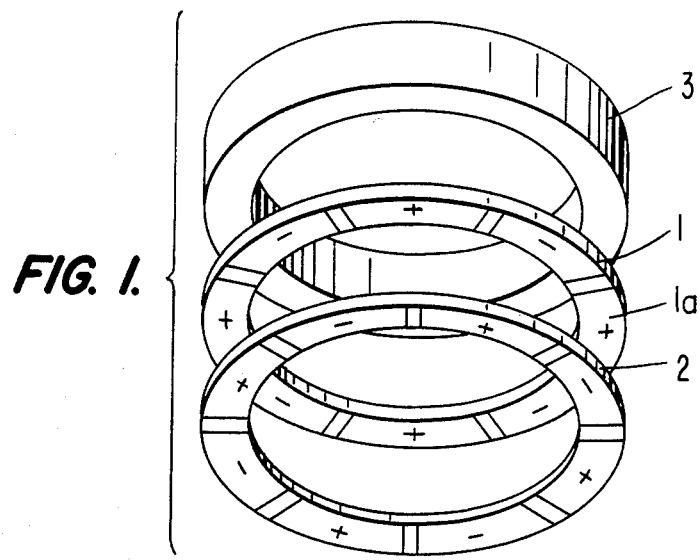
FIG. 1.
FIG. 2.
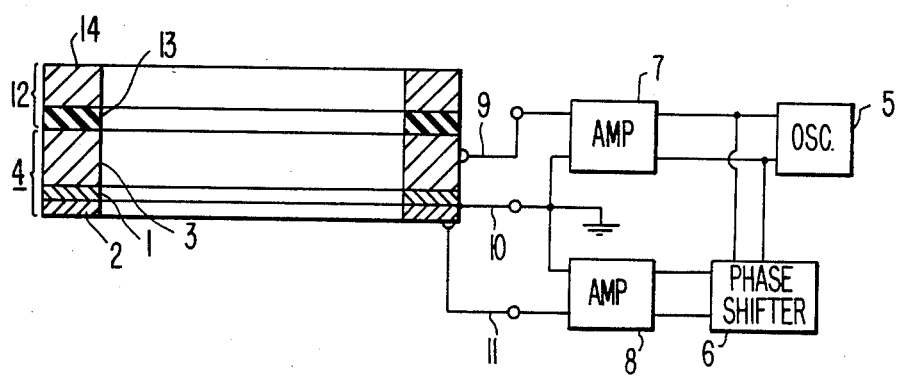
FIG. 3(a).
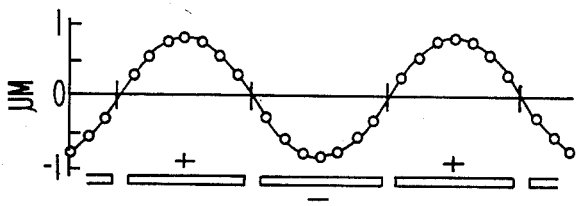
FIG. 3(b).
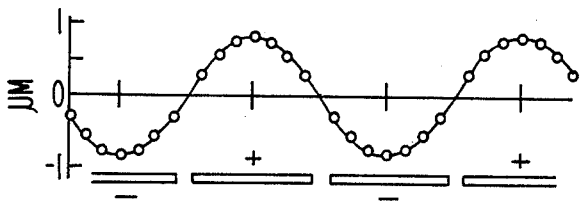
FIG. 3(c).
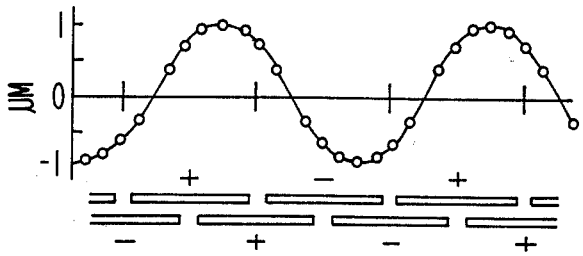

PIEZOELECTRIC MOTOR

BACKGROUND OF THE INVENTION

The present invention relates to a motor using piezoelectric elements to produce rotary or linear drive force.

Electric motors have heretofore required a rotor or stator with a winding or magnet. The mechanical output of these electric motors is proportional to the magnetic flux density of said rotor and stator forming a magnetic circuit. Thus, to increase the electromechanical conversion efficiency, processing or assembing technique of high accuracy has been required.

Generally, the higher the rotative speed of the motor, the higher the efficiency. However, the loss of conversion is largely the loss caused by the winding. At low speeds, large amounts of winding are required and hence the efficiency of conversion at high speeds is as low as ⅓ or 1/5 of that at high speeds.

The same may be said of the so-called linear motor which produces not a rotary but linear motion.

The rotative speed of usual motors is 1000 rpm to 2000 rpm or more. With the linear motor as it is, the distance traveled per second is 1 m to 10 m and in most cases a speed reducer is required, with the result that the motor life is short and its price is high.

Further, the rotary or running parts have high mass and hence high moments of inertia, so that the rise and fall characteristics are bad, making pulse drive difficult. Thus, pulse drive requires a clutch mechanism, brake or other parts and an auxiliary control circuit, resulting in the lack of compactness.

SUMMARY OF THE INVENTION

An object of the invention is to provide piezoelectric rotary and linear motors using piezoelectric vibrators as electromechanical conversion elements of high efficiency, wherein motion produced by the piezoelectric vibrators is used as drive force.

To achieve said object, a piezoelectric motor according to the invention comprises stator including two piezoelectric vibrators and an acoustic material which are thicknesswise stacked, and a slider or rotor thicknesswise placed on said stator in surface contact with the latter. Said two piezoelectric vibrators have thicknesswise polarizations wherein a pair or pairs of divisional regions are separated in the direction of movement of the slider, and these polarizations are opposite to each other. The two piezoelectric vibrators are arranged so that the boundary area of each polarization region of one piezoelectric vibrator is positioned in the vicinity of the middle of each polarization region of the other. When the piezoelectric vibrators arranged in the manner described above are driven by voltages of predetermined forced excitation frequency which are out of phase, the result is a sine function added to a cosine function; the combined vibration of the stator due to the two piezoelectric vibrators has its maximum amplitude position moving in a fixed direction with time, and the vibrator contacting its apex is subjected to a drive force in that direction. Thus, the slider of rotary form obtains a rotary motion, while the vibrator of linear form obtains a linear motion.

BRIEF DESCRIPTION OF THE DRAWINGS

FIG. 1 is an exploded perspective view of the rotor of a piezoelectric rotary motor in an embodiment of the present invention;

FIG. 2 is a sectional view showing the outline of a piezoelectric rotary motor using said stator and also showing its drive circuit;

FIGS. 3a, 3b and 3c are graphs showing distribution strains in the piezoelectric rotary motor stator of FIG. 2;

DETAILED DESCRIPTION OF THE INVENTION

Figure 4:
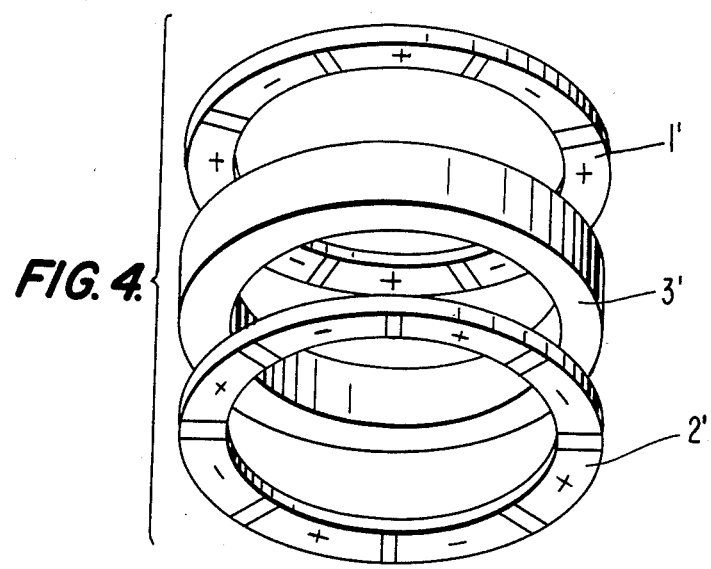
FIG. 4 is an exploded perspective view of a stator in another embodiment of the invention.
Figure 5:
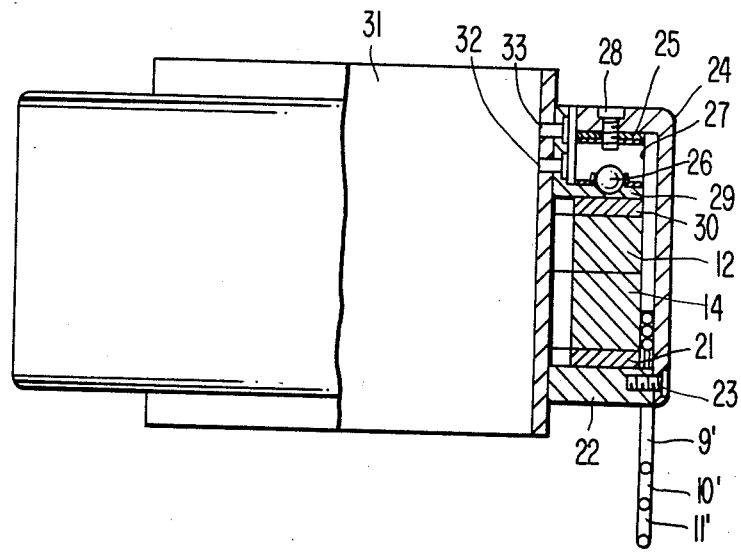
FIG. 5 is a front view, partly in section, showing concrete construction of a piezoelectric rotary motor in an embodiment of the invention.

Embodiments of the invention will now be described in detail with reference to the drawings. The stator has a construction shown, e.g., in FIG. 1. A first piezoelectric vibrator 1 of annular form is provided on its surface with 8 electrodes 1a separated, e.g., by 45° regions. These electrodes 1a are formed on the surface of the first piezoelectric vibrator 1 as by vapor deposition or plating using an electrically conductive material such as gold, silver, silver palladium, rhodium or nickel. The electrodes formed on the back surface (not shown) may or may not be separated similarly to said electrodes on the front surface. The first piezoelectric vibrator 1 is polarized so that adjacent electrodes mutually differ thicknesswise in the direction of polarization. As a result, as shown in FIG. 1, there is formed an 8-pole 4-set forced excitation vibrator with regions having alternate plus and minus polarities. The electrodes 1a need not be separated after polarization and instead they are connected so that a voltage may be applied to them as a whole. A second piezoelectric vibrator 2 of annular form is the same in construction as the first piezoelectric vibrator 1, forming an 8-pole 4-set forced vibrator having alternate plus and minus polarities.

The minimum ampiltude position of said first or second piezoelectric vibrator 1 or 2 is in the vicinity of the boundary between adjacent electrodes, while the maximum amplitude position is in the vicinity of the middle of each electrode. The two piezoelectric vibrators 1 and 2 are stacked so that the boundary of adjacent electrodes which is the minimum amplitude position of the second piezoelectric vibrator 2 is positioned in the vicinity of the middle of the electrode which is the maximum amplitude position of the first piezoelectric vibrator 1.

The first and second piezoelectric vibrators 1 and 2 constructed in the manner described above are put together with a stator base 3 about 1-100 times as thick as the piezoelectric vibrators. The stator base 3 is made of an acoustic material such as aluminum, brass, iron, stainless steel, hardened steel, nylon or other synthetic resin material, ceramic material, glass material or a composite material thereof.

The assembly constructed in the manner described above is used as a stator 4 shown in FIG. 2. As shown in FIG. 2, an output signal produced by an oscillator 5 with a forced excitation drive frequency determined by the stator 4 is branched, one being directly applied to an amplifier 7 and the other to an amplifier 8 through a phase shifter 6. In the phase shifter 6, there is shaped a signal phase-shifted in the range of ±10° to ±170° for use for forward or backward rotation as will be later described. The output singal from said oscillator 5 is applied directly to the amplifier 7 and the thus amplified signal is then applied to the first piezoelectric vibrator 1 through lead wires 9 and 10. As a result, there is produced in the stator 4 a 4-wavelength forced excitation wave corresponding to the 8-pole 4-set forced excitation vibrator wherein a pair of regions of the first piezoelectric vibrator 1 having mutually different polarization directions or plus and minus polarities are taken to correspond to one wavelength. The second piezoelectric vibrator 2 is likewise driven by applying the output of the amplifier 8 thereto through lead wires 10 and 11.

FIGS. 3a, 3b and 3c show the results of measurements of longitudinal strains in terms of variations with respect to circumferential positions when electric signals are applied to the first and second piezoelectric vibrators 1 and 2. The measurements were made on the principle of interference between incident and reflecting light rays by irradiating measurement locations with He-Ne gas laser. FIG. 3a shows the result of measurement where the first piezoelectric vibrator 1 was driven by applying a signal to the lead wires 9 and 10. When 50 V was applied, an amplitude of about ±0.8 μm was observed. The minimum amplitude position is in the vicinity of the boundary of adjacent electrodes, while the maximum amplitude position is in the vicinity of the middle of each electrode. FIG. 3b shows the result of measurement of logitudinal strains where the second piezoelectric vibrator 2 was likewise driven. When 50 V was applied, an amplitude of about ±0.8 μm was observed. The minimum amplitude position is in the vicinity of the boundary of adjacent electrodes, while the maximum amplitude position is in the vicinity of the middle of each electrode.

FIG. 3c shows the result of measurement where the first and second piezoelectric vibrators 1 and 2 were simultaneously driven using the arrangement shown in FIGS. 1 and 2. In the distribution of longitudinal strains, the position indicating the maximum amplitude has moved intermediate between a and b. The maximum amplitude of longitudinal strains has increased by about 1.3 times. In this case, since the second piezoelectric vibrator 2 is driven with a phase shift of ±10° to ±170° with respect to the first piezoelectric vibrator 1, as previously described, the maximum amplitude position of the combined wave C moves in a fixed direction with time.

A rotor 12 contacts the upper surface of the stator 4. The rotor 12 comprises an elastic body 13 made of a friction material or elastic material, and an acoustic material 14 joined thereto.

When the stator 4 is driven as described above, the apex of vibration in the stator 4 on the side opposed to the rotor 12 contacts the latter and since said apex moves with time, it follows that a force having a transverse component is applied to the rotor 12. Thus, the rotor 12 repeats a positional movement due to the transverse component with a drive frequency determined by the stator 4, with the result that a rotary motion of up to several hundred revolutions per minute can be obtained. The generated torque depends on the friction coefficients of the acoustic material constituting the stator and of the rotor making surface contact with the stator and on the area of contact and the magnitude of load; torques ranging from several ten to several thousand g·cm were obtained. As for the direction of rotation, if a rotation obtained when the second piezoelectric vibrator is driven by applying thereto a signal phase-shifted by ±10° to ±170° with respect to the reference signal is taken, e.g., a positive, then a rotation obtained when it is driven by applying thereto a signal phase-shifted by −10° to −170° with respect to the reference signal simultaneously therewith is a reverse rotation. Further, the number of revolutions can be optionally determined by selecting the magnitude or phase of the applied signal or the magnitude of load on the contact area.

FIG. 4 shows a stator 15 of different arrangement.

The basic arrangement consists in first and second peizoelectric vibrators 1' and 2' having interposed therebetween a stator base 3' about 1–100 times as thick as the piezoelectric vibrators. The material and construction of the individual members are the same as in the embodiment shown in FIG. 1. The relative disposition of polarization of the first and second piezoelectric vibrators 1' and 2' is exactly the same as in the stator 4 shown in FIGS. 1 and 2.

Figure 6:
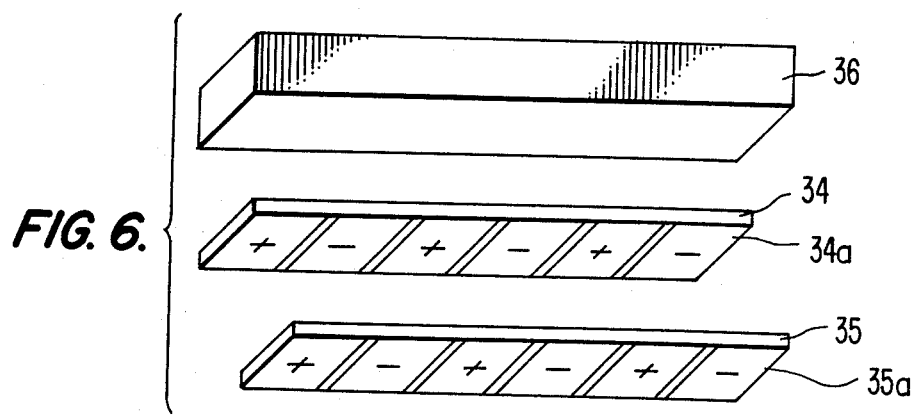
FIG. 6 is an exploded perspective view of the stator of a piezoelectric linear motor in an embodiment of the invention.

FIG. 6 shows an example of a peizoelectric rotary motor using the stator and other components shown in FIGS. 1 and 2. The stator 14 having lead wires 9' and 10' and 11' attached thereto is mounted for vibration on a guide disk 22 thorough a buffer 21. The guide disk 22 is fixed to a frame 22 by a fastener 23. Fixed to the upper portion of said frame 24 by a fastener 28 through a buffer plate 25 is an elastic plate 27 rotatably holding a plurality of small balls 26. The small balls 26 fit in the U-shaped groove of a rotary arm 29, whereby the latter is guided in rotation. The rotary arm 29 is engaged with the slider 12 through a clutch 30. The rotor 12 has an electric body 13 of friction material or elastic material disposed on its surface of contact with the stator 14, as shown in FIG. 2. A rotary shaft 31 is fixed to said rotary arm 29 by fasteners 32 and 33.

In the piezoelectric motor having the arrangement described above, if a drive signal is applied to the stator 4,, said rotary shaft 31 starts rotating with rotation of said rotor 12. The clutch 30 will act at the start or during accidental torque increase so as to mitigate the reaction.

The power efficiency of the peizoelectric rotary motor of aforesaid arrangement was measured to find that it was substantially greater than that of DC micromotors. As it can be constructed in annular form, it can be made to look less bulky. Further, changing the phase of the drive signal makes it possible to selectively provide forward or backward rotation, and with rotation at low speed less than 100 rpm, a torque of several thousand g·cm can be produced. Further, the number of revolutions can be optionally selected by selecting the magnitude or phase of the applied signal or the size of the contact area. Thus, there is no need to use any speed reducer. Further, because of a contact friction pair being present at all times, there is no moment of inertia, and the motor is operable with a very small pulse and is compact. Further the motor is very simple in construction and hence it is less expensive.

Figure 7:
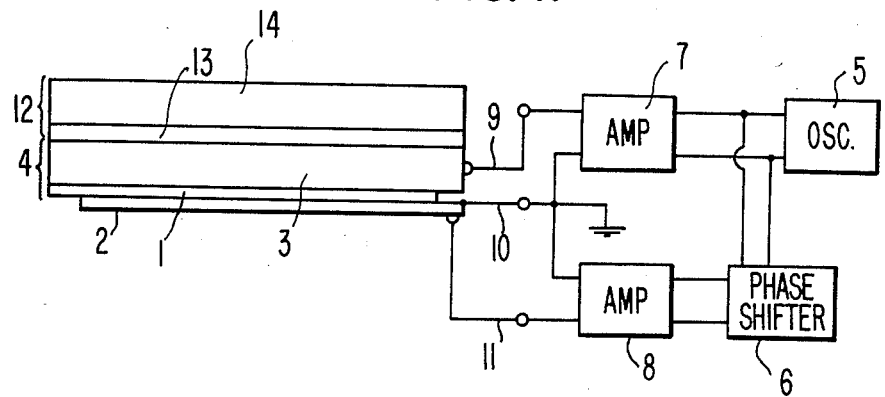
FIG. 7 is a front view showing the outline of a piezoelectric linear motor using said stator, and its drive circuit.

A piezoelectric linear motor according to the present invention will now be described in detail with reference to the drawings. FIG. 7 shows the construction of a stator. In this figure, the surface of a first piezoelectric vibrator 34 of linear form is formed with, e.g., 6 electrodes by printing, vapor deposition or plating using an electrically conductive material such as gold, silver, silver palladium, rhodium or nickel, said electrodes being divisional regions each being, e.g., about 10-cm long. The electrodes formed on the back surface (not shown) may or may not be separated similarly to the electrodes on the front surface. The first piezoelectric vibrator arranged in the manner described above is polarized so that adjacent electrodes mutually differ thicknesswise in the direction of polarization. As a result, as shown in FIG. 7, there is formed a 6-pole 3-set forced excitation vibrator with regions having alternate plus and minus polarities. The electrodes 34a need not be separated after polarization and instead they are connected so that a voltage may be applied to them as a whole. A second piezoelectric vibrator 35 of linear form is the same in construction as the first piezoelectric vibrator 34, forming a 6-pole 3-set forced excitation vibrator having alternate plus and minus polarities. The electrodes 35a need not be separated after polarization and instead they are connected so that a voltage may be applied to them as a whole.

The minimum amplitude position of the first or second piezoelectric vibrator 34 or 35 is in the vicinity of the boundary between adjacent electrodes, while the maximum amplitude position is in the vicinity of the middle of each electrode. The two piezoelectric vibrators 34 and 35 are stacked so that the boundary of adjacent electrodes which is the minimum amplitude position of the second piezoelectric vibrator 35 is positioned in the vicinity of the middle of the electrode which is the maximum amplitude position of the first piezoelectric vibrator 34.

The two piezoelectric vibrators 34 and 35 constructed in the manner described above are put together with a stator base 36 about 1-100 times as thick as the piezoelectric vibrators. The stator base 36 is made of an acoustic material such as aluminum, brass, iron, stainless steel, hardened steel, nylon or other synthetic resin material, ceramic material, glass material or a composite material thereof.

Figure 8:
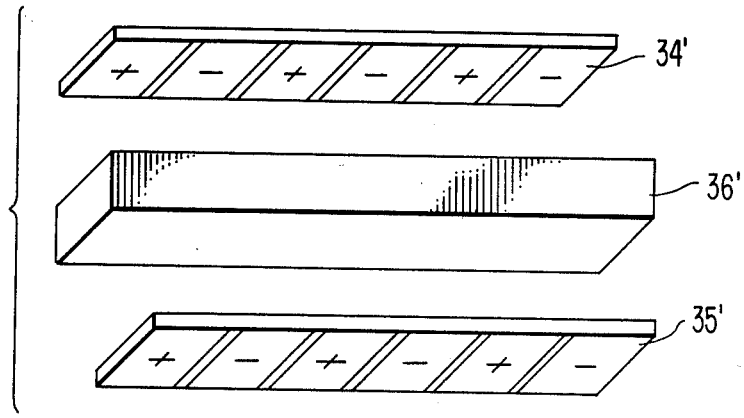
FIG. 8 is an exploded perspective view of a stator in another embodiment of the invention.
Figure 9:
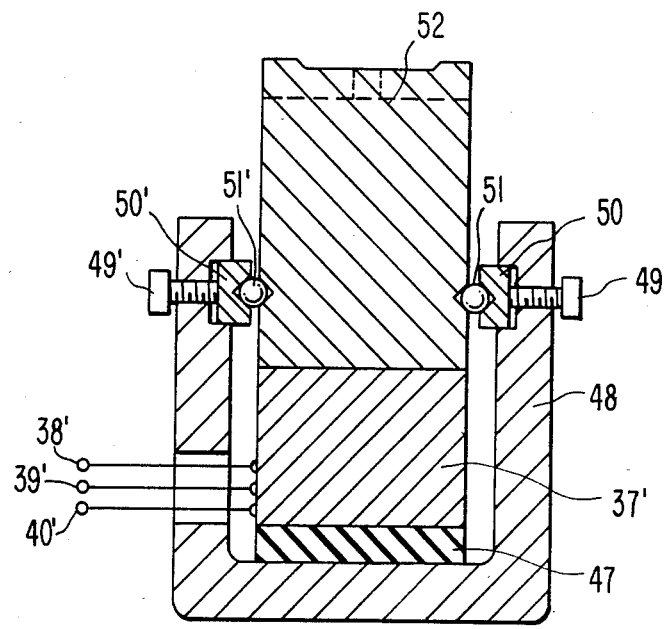
FIG. 9 is a sectional view showing the concrete arrangement of a piezoelectric linear motor in an embodiment of the invention.

The assembly constructed in the manner described above is used as a stator 37 shown in FIG. 8. As shown in FIG. 8, an output signal produced by an oscillator 5 with a forced excitation drive frequency determined by the stator 37 is branched, one being directly applied to an amplifier 7 and the other to an amplifier 8 through a phase shifter 6. In said phase shifter 6, there is shaped a signal phase-shifted in the range of ±10° to ±170° for use for forward or backward running as will be later described. The output signal from said oscillator 5 is applied directly to the amplifier 7 and the thus amplified signal is then applied to the first piezoelectric vibrator 34 through lead wires 38 and 38. As a result, there is produced in said stator 37 a 3-wavelength forced excitation wave corresponding to the 6-pole 3-set forced excitation vibrator wherein a pair of regions of the first piezoelectric vibrator 34 having mutually different polarization directions or plus and minus polalities are taken to correspond to one wavelength. The second piezoelectric vibrator 35 is likewise driven by applying the output of the amplifier 8 thereto through lead wires 39 and 40.

Longitudinal strains were measured in terms of variations with respect to longitudinal positions when electric signals were applied to the first and second piezoelectric vibrators 34 and 35. When 50 V was applied, an amplitude of about ±0.8 μm was observed. The minimum amplitude position is in the vicinity of the boundary of adjacent electrodes, while the maximum amplitude position is in the vicinity of the middle of each electrode.

The two piezoelectric vibrators 34 and 35 were driven with the arrangement shown in FIGS. 7 and 8. Since the two piezoelectric vibrators 34 and 35 are driven with phase shift, as described above, the combined wave modes in a fixed direction with time. For example, where a signal having a phase difference of 90° with respect to a reference signal applied to the first piezoelectric vibrator 34 is applied to the second piezoelectric vibrator 35, the latter exhibits the minimum amplitude when the first piezoelectric vibrator 34 exhibits the maximumm amplitude in the same pole. When said two vibrations are combined as time elapses, for example, said combined wave moves from left to right.

A slider 41 contacts the upper surface of the stator 37. The slider 41 comprises an elastic body 42 made of a friction material or elastic material, and an acoustic material 43 joined thereto.

When the stator 37 is driven as described above, the apex of vibration in the stator 37 on the side opposed to the slider 41 contacts the latter and since said apex moves with time, it follows that a force having a transverse component is applied to the slider 41 Thus, the slider 41 repeats a positional movement due to the transverse component with a drive frequency determined by the stator 37, with the result that a linear motion of up to several hundred mm per second can be obtained. The generated moving force depends on the friction coefficients of the acoustic material constituting the stator and of the runner making surface contact with the stator and on the area of contact and the magnitude of load; moving force ranging from several ten to several thousand g cm were obtained. As for the direction of run, if a run obtained when the second piezoelectric vibrator is driven by applying thereto a signal phase-shifted by 10° to 170° with respect to the reference signal is taken, e.g., as positive, then a run obtained when it is driven by applying thereto a signal phase-shifted by ±10° to +170° simultaneously therewith is a reverse run. Further, the running speed can be optionally determined by selecting the magnitude or phase of the applied signal or the magnitude of load on the contact area.

FIG. 10 shows a stator of different arrangement. The basic arrangement consists in first and second piezoelectric vibrators 34' and 35' having interposed therebetween a stator base 36' and 35' having interposed therebetween a stator base 36' about 1-100 times as thick as said piezoelectric vibrators. The relative disposition of polarization of the first and second piezoelectric vibrators 34' and 35' is exactly the same as in the stator 37 shown in FIGS. 7 and 8.

FIG. 12 shows an embodiment of a piezoelectric linear motor using the stator and other components shown in FIGS. 7 and 8 or FIGS. 10 and 11. A stator 37' having lead wires 38', 39' and 40' attached thereto is mounted for vibration, with a suitable degree of elasticity, on a frame 48 through a buffer 47. The frame 48 has position adjusting screws 49 and 49' rotatably installed in the upper portion thereof, said screws carrying guide plates 50 and 50', respectively, at their front ends. A plurality of small balls 51 and 51' are held with a suitable degree of force between said guide plates 50 and 50' and the V-shaped grooves of the slider 52. The lower surface of said slider 52 and the upper surface of said stator 37' form a friction contact pair under a suitable degree of elastic force exerted by the buffer 47.

What is claimed is:

1. A piezoelectric motor characterized in that two piezoelectric vibrators each divided into at least a pair of regions whose directions of polarization are alternately reversed are arranged so that disposed on the vicinity of the middle of each said region of one piezoelectric vibrator is the boundary of each said region of the other, a base made of an acoustic material is put together with said two piezoelectric vibrator to from a stator, and a runner is provided which is in surface contact with said stator.

2. A piezoelectric motor as claimed in claim 1, in which said vibrators and base are of a circular or ring shape, said divided regions of said vibrators being disposed in the circumferential direction, and said runner constitutes a rotor.

3. A piezoelectric motor as claimed in claim 1, in which said vibrator and base are of a linear shape, said divided regions of said vibrators being disposed in the longitudinal direction, whereby said runner is linearly drived.

4. A piezoelectric motor as claimed in claim 1, wherein the two piezoelectric vibrators have applied thereto voltages of predetermined frequency which are out of phase.

5. A piezoelectric motor as claimed in claim 1, wherein the runner comprises an elastic boby positioned at the stator, and an acoustic material joined thereto.

6. A piezoelectric motor as claimed in claim 1, wherein the two piezoelectric vibrators are each equally divided.

7. A piezoelectric motor as claimed in claim 1, wherein the stator is about 1–100 times as thick as the piezoelectric vibrators.

* * * * *